Aug. 25, 1970  G. I. EKSTRÖM ET AL  3,525,531

TOOL RETAINER

Filed Dec. 19, 1968

INVENTORS
Gösta Ivar Ekström
Jarl Joel Blomberg
BY Eric Y. Munson
Attorney

Aug. 25, 1970  G. I. EKSTRÖM ET AL  3,525,531
TOOL RETAINER

Filed Dec. 19, 1968  3 Sheets-Sheet 2

INVENTOR.
Gösta Ivar Ekström
Jarl Joel Blomberg
by Eric Y. Munson
Attorney

Aug. 25, 1970    G. I. EKSTRÖM ET AL    3,525,531
TOOL RETAINER

Filed Dec. 19, 1968    3 Sheets-Sheet 3

INVENTOR.
Gosta Ivar Ekström
Jarl Joel Blomberg
By
Attorney

United States Patent Office 3,525,531
Patented Aug. 25, 1970

3,525,531
TOOL RETAINER
Gösta Ivar Ekström and Jarl Joel Blomberg, Nacka, Sweden, assignors to Atlas Copco Aktiebolag, Nacka, Sweden, a corporation of Sweden
Filed Dec. 19, 1968, Ser. No. 785,258
Claims priority, application Sweden, Dec. 27, 1967, 17,794/67
Int. Cl. B23b 31/08, 45/00
U.S. Cl. 279—19.6                                    9 Claims

ABSTRACT OF THE DISCLOSURE

A working tool or implement retainer for a percussion tool comprising a sleeve or cap of resilient material such as rubber fixed to the front end of the tool and provided with a resilient end portion in which the working tool or implement such as a chisel, a drill steel, a concrete breaker steel or the like may be inserted and kept in position in the tool by the subsequent attachment to the end portion of the sleeve of a substantially non-yielding locking ring which prevents radial flexing of the end portion. Removal of the working tool or implement may be carried out after removal of the locking ring.

---

The invention consists substantially in the combination with a percussion tool of an implement retainer for a working implement having a shank with a collar and a shank end adapted to be inserted in said tool, said retainer comprising a sleeve of resilient material such as rubber, fixation means on said sleeve and said tool for holding the sleeve on to the tool against axial displacement, an end portion on the sleeve capable of flexing resiliently radially outwards, an inwardly directed retaining flange on said end portion defining a reduced free opening less than the outer contour of said collar, and a radially substantially non-yielding locking ring with larger free opening than said outer contour of the collar arranged to be resiliently fixed to the end portion of the sleeve to prevent radial flexing of the end portion.

One object of the invention is to provide an implement or tool retainer which is cheap in manufacture and has high resistance to damage and which permits the insertion and removal of an implement or working tool having a shank with a collar and a shank end adapted to be inserted in the tool in a simple manner. A further object of the invention is to provide an implement retainer which may be used in connection with working implement having a shank portion with a collar and a portion carrying a spade blade, a broad chisel or another device which has substantially larger cross sectional dimensions than the opening of the implement retainer. The implement retainer according to the invention furthermore eliminates the use of separate percussion damping elements. The implement retainer according to the invention consists of only two or three separate parts. The retainer according to the invention does not cause wear of the tool. The above and other purposes are achieved by the invention.

Figure 1:
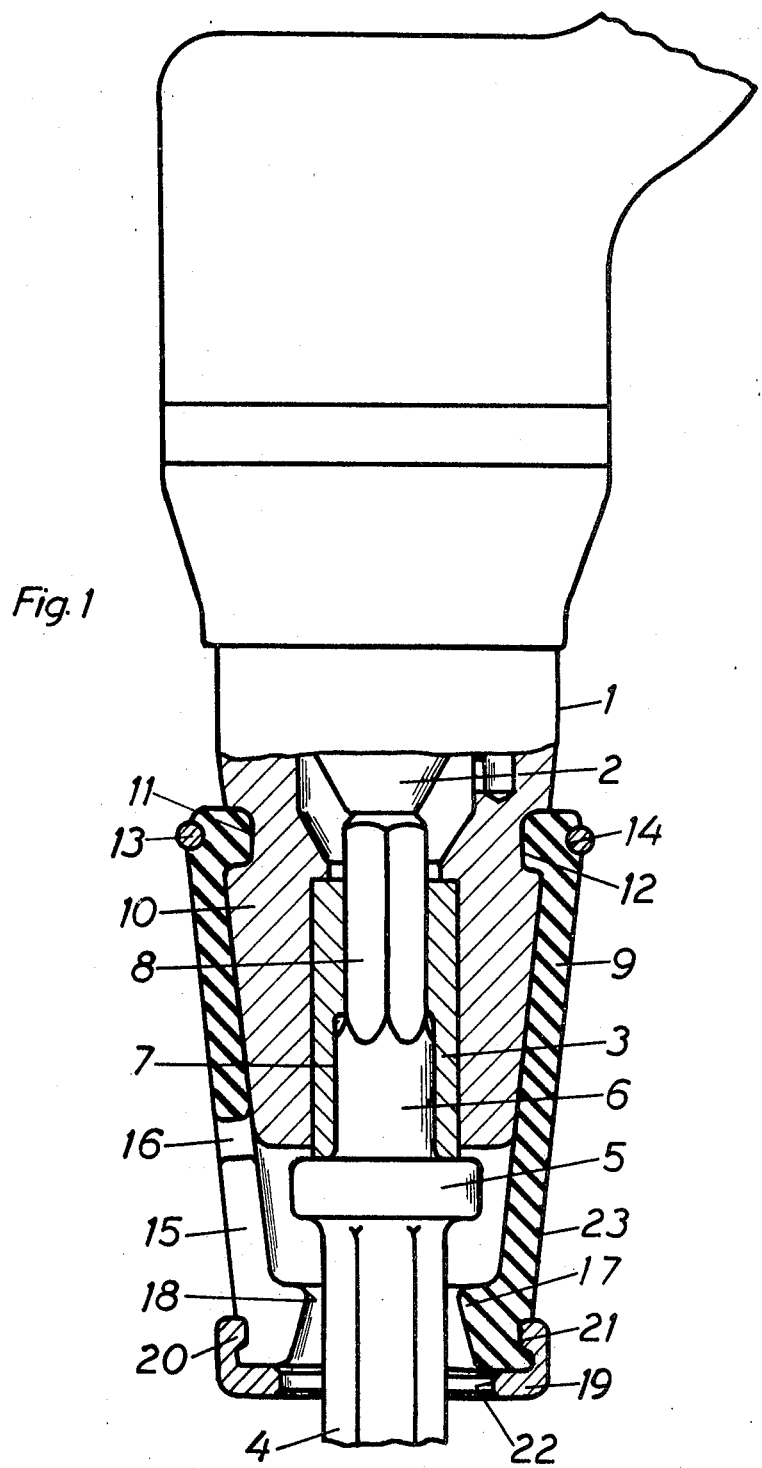
Figure 2:
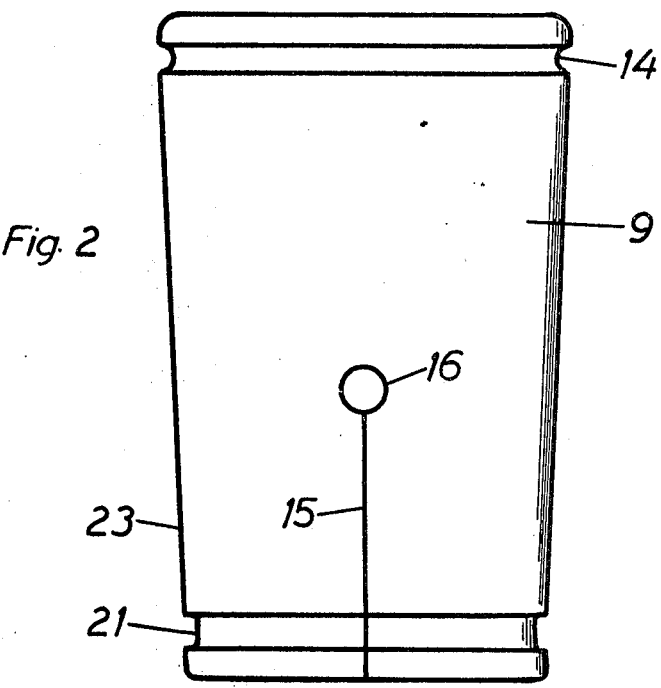
Figure 4:
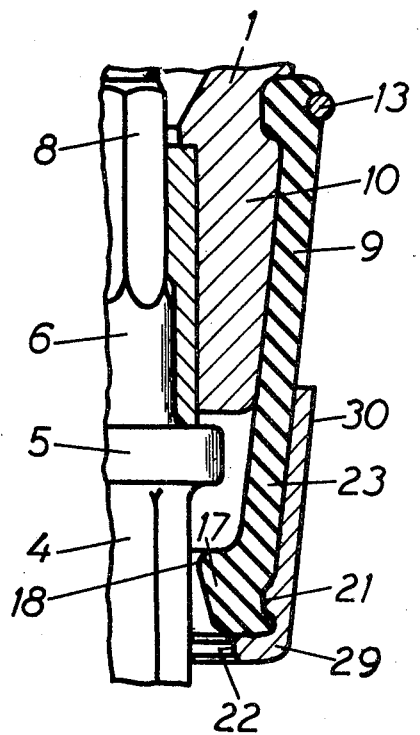
Figure 3:
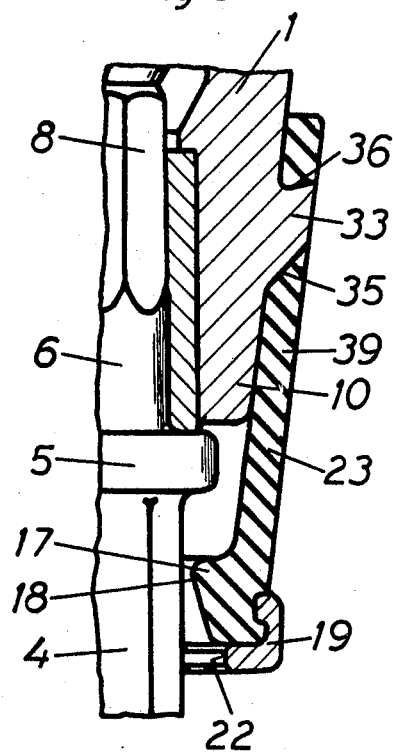
Figure 5:
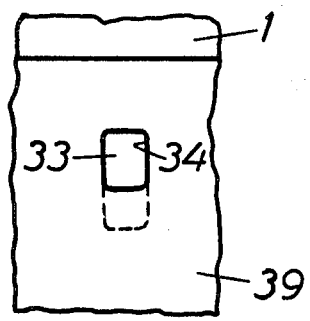

In the accompanying drawings some embodiments of implement retainers according to the invention are illustrated by way of example. FIG. 1 is a side view and partial section of a percussion tool such as a concrete breaker, a spade machine or a chisel provided with an implement retainer according to the invention. FIG. 2 is a side view of the retainer according to FIG. 1. FIG. 3 is a fragmentary side view and section of a modification of the tool in FIG. 1 and FIG. 4 is a fragmentary side view and section of a further modification of an implement retainer according to the invention. FIG. 5 is a detail of FIG. 3 in side view.

The percussion tool illustrated in FIG. 1 is a compressed air driven chisel or a compressed air driven concrete breaker or the like which has a cylinder casing designated 1. A hammer piston 2 is movable back and forth in the cylinder casing under the action of a pressure fluid such as compressed air. The cylinder casing has a lower end portion 10 provided with a chuck bushing 3 for a working implement which is inserted in the percussion tool. The working implement has a shank 4 with an annular collar 5 and a shank end 6 which in the illustrated embodiment has a circular cross section along a portion 7 adjacent the collar 5 and hexagon cross section along a portion 8. The portions 7, 8 fit in corresponding parts of the chuck bushing 3. The shank 4 of the working implement may carry a spade blade, a broad chisel or another not illustrated device such as a straight chisel, for instance a pike. The working implement 4, 5, 6 is held in the tool by an implement retainer 9 which comprises a slightly conical sleeve of rubber fitted on the lower end portion 10 of the cylinder casing 1. The implement retainer has annular cross section and is slightly conical and is provided at the upper end with an internal annular flange 11 which fits into and engages an annular groove 12 in the outer wall of the cylinder casing 1. In certain cases the resiliency of the annular flange 11 may be sufficient for holding the retainer onto the tool but in order to increase the grip it may sometimes be suitable to provide a preferably split spring steel ring 13 which encloses the retainer and is positioned in an external annular groove 14 in the retainer. If the ring 13 is a continuous ring the elasticity of the rubber of the retainer and the inner diameter of the ring have to be selected so that the ring may be forced into position on the sleeve. At a lower narrow end portion 23 of the implement retainer an axial slot 15 is provided which ends in an opening 16. The end portion 23 of the retainer forms an internal annular flange 17 the free inner opening 18 of which has less cross section than the outer contour of the collar 5 so that when the collar is in the retainer the collar is prevented from passing out through the opening 18. In certain cases the radially resilient portion 23 of the implement retainer may be carried out without a slot and instead with such elasticity that the collar 5 may be pressed through the opening 18. A continuous substantially non-yielding annular steel ring 19 encloses the narrow end portion 23 of the retainer 9 and is provided with an internal annular flange 20 which when the ring 19 is in position engages an external annular groove 21 of the retainer.

When it is desired to remove the working implement 4, 5, 6 from the implement retainer 9 the steel ring 19 is at first loosened from the retainer whereupon the shank of the working implement with the collar 5 may be pulled out of the retainer and the implement may be removed. The inner free opening 22 of the ring 19 is larger than the outer contour of the collar 5 so that the ring 19 without difficulty may be passed over the collar. When it is desired to insert a working implement in the retainer according to the invention a ring 19 is at first placed around the shank of the implement and moved on past the collar 5 whereafter the implement is inserted with the shank end 6 and the collar 5 through the implement retainer which then yields resiliently and permits the insertion so that the shank end 6 can be inserted in the chuck bushing 3. The locking ring 19 is then pushed over the narrow end portion 23 of the retainer into position as illustrated in FIG. 1. The implement is then locked in the implement retainer so that it can not fall out. The annular flange 17 and the material of the implement retainer form a resilient abutment or shoulder for the collar 5 so that no separate percussion dampening device is necessary. The implement retainer according to the invention may naturally be used in connection with any working implement which has a shank 4 with a collar 5 or the like and a shank end adapted for insertion in a chuck bushing or the like in a tool. Such working implements may for instance be spades, chisels, pikes and the like.

The embodiments of the invention illustrated in FIGS. 1 and 2 should only be considered as examples and may be modified in several different ways within the scope of the claims. In the modification according to FIGS. 3–5 the same reference numerals as in FIGS. 1 and 2 have been used to indicate equivalent parts. FIG. 3 illustrates in section only the right lower portion of a percussion chisel hammer 1 or the like. In order to retain an implement retainer 39 onto the casing 1 said casing is here provided with a number of projecting lugs 33 and the retainer 39 has corresponding recesses 34. The retainer sleeve 39 is fitted on the casing 1 by pressing the sleeve over the projecting lugs 33 which in order to facilitate assembly and fixation of the sleeve have surfaces 35, 36 inclined slightly upwards. In the modification according to FIG. 4 the locking ring 29 is provided with a cup 30 which extends upwards along the outside of the end portion 23 and stiffens and protects said end portion. The cap 30 may also be carried out as a part separate from 29 in which case it may be provided at the inner side of the sleeve.

We claim:

1. In combination with a percussion tool; an implement retainer for a working implement having a shank with a collar and a shank end adapted to be inserted in said tool, said retainer comprising a sleeve of resilient material, fixation means on said sleeve and said tool for holding the sleeve on to the tool against axial displacement, a portion on the sleeve capable of flexing resiliently radially outwards, an inwardly directed retaining flange on said portion defining a reduced free opening less than the outer contour of said collar, and a radially substantially non-yielding locking ring with larger free opening than said outer contour of the collar arranged to be resiliently fixed to the end portion of the sleeve to prevent radial flexing therein.

2. The combination according to claim 1, in which the fixation means comprise an inwards directed flange at the fixation end of the sleeve and an annular groove in the tool, which is resiliently engaged by said flange for holding the sleeve against axial displacement.

3. The combination according to claim 2, in which a spring ring is provided at the outside of the sleeve just in the area of said inwards directed flange.

4. The combination according to claim 1, in which the resilient end portion of the sleeve has an external annular groove and said locking ring has a radially inwards directed annular flange which engages said groove and is held therein by the resiliency of the end portion and which prevents the end portion from flexing outwards and the collar from moving out from the sleeve.

5. The combination according to claim 1, in which the fixation means comprise lugs projecting from the tool and corresponding recesses in the sleeve.

6. The combination according to claim 1, in which the resiliently flexing end portion is axially split.

7. The combination according to claim 1, in which the radially outwards resiliently flexing end portion is supported by a cap.

8. The combination according to claim 7, in which said cap is made integral with said locking ring.

9. The combination according to claim 4, in which the fixation means comprise lugs projecting from the tool and corresponding recesses in the sleeve.

References Cited

UNITED STATES PATENTS 1,580,617   4/1926   Levedahl _____ 279—19.6
2,767,528   10/1956   Tocci-Guilbert.

HAROLD D. WHITEHEAD, Primary Examiner

DONALD D. EVENSON, Assistant Examiner